(12) United States Patent
Bullock et al.

(10) Patent No.: US 11,007,748 B2
(45) Date of Patent: May 18, 2021

(54) INHERENTLY SECURED AEROGEL COMPOSITES

(75) Inventors: Daniel E. Bullock, North Attleboro, MA (US); Aaron R Tomich, Nashua, NH (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 13/486,193

(22) Filed: Jun. 1, 2012

(65) Prior Publication Data

US 2012/0238174 A1     Sep. 20, 2012

Related U.S. Application Data

(60) Continuation of application No. 12/685,240, filed on Jan. 11, 2010, now Pat. No. 8,214,980, which is a
(Continued)

(51) Int. Cl.
*B32B 5/02* (2006.01)
*B32B 5/24* (2006.01)
(Continued)

(52) U.S. Cl.
CPC .............. *B32B 5/024* (2013.01); *B32B 5/022* (2013.01); *B32B 5/06* (2013.01); *B32B 5/10* (2013.01);
(Continued)

(58) Field of Classification Search
CPC .. B32B 5/245; B32B 5/32; B32B 5/10; B32B 5/022; D04H 1/4374; D04H 1/498; Y10T 442/652; Y10T 442/50; Y10T 442/3325; Y10T 442/647; Y10T 428/249955; Y10T 428/249953
(Continued)

(56) References Cited

U.S. PATENT DOCUMENTS 2,188,007 A     1/1940  Kistler
3,154,462 A  * 10/1964  Smith, II .................. 442/102
(Continued)

FOREIGN PATENT DOCUMENTS

FR     2912427 A1 *  8/2008
JP  2000080549 A  *  3/2000

OTHER PUBLICATIONS

English Translation of JP 2000-080549.*
Definition of "foam", Merriam-Webster Online Dictionary, Jul. 3, 2009.

*Primary Examiner* — Hai Vo
(74) *Attorney, Agent, or Firm* — Christopher Stow; Poongunran Muthukumaran

(57) ABSTRACT

Embodiments of the present invention describe secured fiber-reinforced aerogels and laminate structures formed therefrom. In one embodiment a laminate comprises at least one fiber-reinforced aerogel layer adjacent to at least one layer of fiber containing material wherein fibers from said at least one fiber-reinforced aerogel layer are interlaced with fibers of said at least one fiber-containing material. In another embodiment a laminate comprises at least two adjacent fiber-reinforced aerogel layers wherein fibers from at least one fiber-reinforced aerogel layer are interlaced with fibers of an adjacent fiber-reinforced aerogel layer.

19 Claims, 1 Drawing Sheet

Related U.S. Application Data division of application No. 11/457,504, filed on Jul. 14, 2006, now abandoned.

(60) Provisional application No. 60/699,840, filed on Jul. 15, 2005.

(51) Int. Cl.
| | | |
|---|---|---|
| *B32B 5/26* | (2006.01) | |
| *D04H 1/4374* | (2012.01) | |
| *D04H 1/498* | (2012.01) | |
| *B32B 5/06* | (2006.01) | |
| *B32B 5/10* | (2006.01) | |
| *B32B 5/32* | (2006.01) | |

(52) U.S. Cl.
CPC ............... *B32B 5/245* (2013.01); *B32B 5/26* (2013.01); *B32B 5/32* (2013.01); *D04H 1/4374* (2013.01); *D04H 1/498* (2013.01); B32B 2250/02 (2013.01); B32B 2250/20 (2013.01); B32B 2260/021 (2013.01); B32B 2262/00 (2013.01); B32B 2266/0214 (2013.01); B32B 2266/0242 (2013.01); B32B 2266/0278 (2013.01); B32B 2266/0285 (2013.01); B32B 2266/053 (2016.11); B32B 2266/057 (2016.11); B32B 2266/126 (2016.11); B32B 2305/022 (2013.01); B32B 2305/026 (2013.01); B32B 2305/08 (2013.01); B32B 2307/202 (2013.01); B32B 2307/302 (2013.01); B32B 2307/3065 (2013.01); B32B 2605/12 (2013.01); B32B 2605/18 (2013.01); *Y10T 428/24996* (2015.04); *Y10T 428/24997* (2015.04); *Y10T 428/249924* (2015.04); *Y10T 428/249953* (2015.04); *Y10T 428/249955* (2015.04); *Y10T 428/249967* (2015.04); *Y10T 428/249969* (2015.04); *Y10T 442/3325* (2015.04); *Y10T 442/50* (2015.04); *Y10T 442/647* (2015.04); *Y10T 442/652* (2015.04)

(58) Field of Classification Search
USPC ............... 428/304.4, 311.11, 312.2, 317.9
See application file for complete search history.

(56) References Cited

U.S. PATENT DOCUMENTS

| | | |
|---|---|---|
| 3,937,861 A | 2/1976 | Zuckerman |
| 4,258,097 A | 3/1981 | Benedyk |
| 4,363,738 A | 12/1982 | Kummermehr |
| 4,447,345 A | 5/1984 | Kummermehr |
| 4,619,908 A | 10/1986 | Cheng |
| 4,667,417 A | 5/1987 | Graser |
| 4,717,708 A | 1/1988 | Cheng |
| 4,943,465 A | 7/1990 | Bailey |
| 5,221,573 A | 6/1993 | Baigas |
| 5,275,796 A | 1/1994 | Tillotson |
| 5,306,555 A | 4/1994 | Ramamurthi |
| 5,420,168 A | 5/1995 | Mayer |
| 5,565,142 A | 10/1996 | Deshpande |
| 5,786,059 A | 7/1998 | Frank |
| 5,789,075 A * | 8/1998 | Frank et al. ............... 428/312.6 |
| 5,830,387 A | 11/1998 | Yokogawa |
| 5,866,027 A | 2/1999 | Frank |
| 5,962,539 A | 10/1999 | Perrut |
| 5,972,254 A | 10/1999 | Sander |
| 5,973,015 A | 10/1999 | Coronado |
| 6,068,882 A | 5/2000 | Ryu |
| 6,080,475 A | 6/2000 | Frank |
| 6,083,619 A | 7/2000 | Frank |
| 6,087,407 A | 7/2000 | Coronado |
| 6,140,377 A | 10/2000 | Schwertfeger |
| 6,187,250 B1 | 2/2001 | Champagne |
| 6,197,270 B1 | 3/2001 | Sonada |
| 6,315,971 B1 | 11/2001 | Wallace |
| 6,479,416 B1 | 11/2002 | Frank |
| 6,620,355 B1 | 9/2003 | Schmidt |
| 6,656,527 B1 | 12/2003 | Gessner |
| 6,670,402 B1 | 12/2003 | Lee |
| 6,887,563 B2 | 5/2005 | Frank |
| 6,989,123 B2 | 1/2006 | Lee |
| 7,078,359 B2 | 7/2006 | Stepanian |
| 7,399,439 B2 | 7/2008 | Lee |
| 7,504,346 B2 | 3/2009 | Stepanian |
| 7,635,411 B2 | 12/2009 | Rouanet |
| 7,780,890 B2 | 8/2010 | Lee |
| 8,214,980 B2 | 7/2012 | Bullock |
| 2002/0090873 A1 | 7/2002 | Moody |
| 2002/0094426 A1 * | 7/2002 | Stepanian et al. ......... 428/292.1 |
| 2004/0142168 A1 * | 7/2004 | Hrubesh et al. ............. 428/375 |
| 2004/0244164 A1 | 12/2004 | Ferguson |
| 2005/0167891 A1 | 8/2005 | Lee |
| 2005/0192366 A1 | 9/2005 | Ou |
| 2005/0192367 A1 | 9/2005 | Ou |
| 2006/0013996 A1 | 1/2006 | Koyama |
| 2006/0264132 A1 | 11/2006 | Leeser |
| 2007/0154698 A1 | 2/2007 | Stepanian |
| 2007/0152363 A1 | 7/2007 | Begag |
| 2007/0284558 A1 | 12/2007 | Flay |
| 2009/0229032 A1 | 9/2009 | Stepanian |
| 2010/0015425 A1* | 1/2010 | Bindschedler et al. ...... 428/219 |
| 2012/0097907 A1 | 4/2012 | Bauer |
| 2012/0238174 A1* | 9/2012 | Bullock .................. B32B 5/245 442/374 |

* cited by examiner

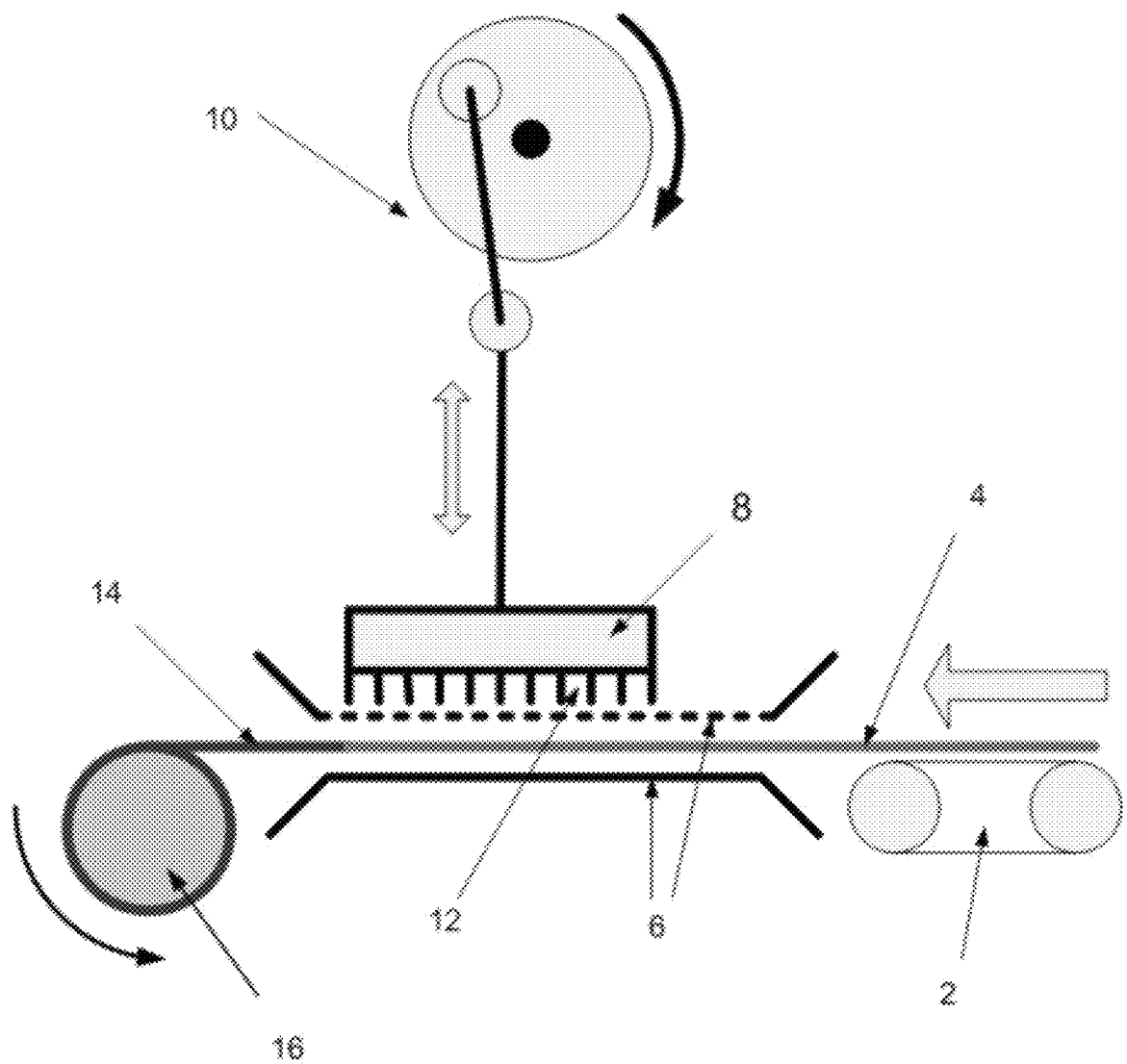

INHERENTLY SECURED AEROGEL COMPOSITES

CROSS-REFERENCES TO RELATED APPLICATIONS

This application claims benefit of priority from the following applications: U.S. patent application Ser. No. 12/685,240 filed Jan. 11, 2010 which is a divisional application of U.S. patent application Ser. No. 11/457,504 filed Jul. 14, 2006, which claims the benefit of priority from U.S. Provisional Patent Application No. 60/699,840 filed on Jul. 15, 2006; all of which are hereby incorporated by reference in their entirety as if fully set forth.

SUMMARY OF THE INVENTION

Embodiments of the present invention describe secured fiber-reinforced aerogels and laminate structures formed therefrom. In one embodiment a laminate comprises at least one fiber-reinforced aerogel layer adjacent to at least one layer of fiber-containing material wherein fibers from said at least one fiber-reinforced aerogel layer are interlaced with fibers of said at least one fiber-containing material. The layer of fiber-containing material can comprise a fiber-reinforced foam composite or fiber-reinforced polymeric composite. Alternatively, or in addition to, the layer of fiber-containing material can comprise a felt, batting, lofty batting, mat, woven fabric, non-woven fabric or a combination thereof, The aerogel layer can comprise a felt, batting, lofty batting, mat, woven fabric, non-woven fabricor a combination thereof. In some embodiments a functional layer that is radiation absorbing, radiation reflecting, thermally conductive or electrically conductive is used. In another embodiment, a laminate comprises at least two adjacent fiber-reinforced aerogel layers wherein fibers from at least one fiber-reinforced aerogel layer are interlaced with fibers of an adjacent fiber-reinforced aerogel layer. Again the fiber-reinforced aerogel layer can comprise a felt, batting, lofty batting, mat, woven fabric, non-woven fabric or a combination thereof. Also again this laminate can comprise a functional layer that is radiation absorbing, radiation reflecting, thermally conductive or electrically conductive. One method of practicing an embodiment of the present invention includes the steps of:

a) disposing a laminate comprising at least one layer of a fiber-containing material adjacent to at least one fiber-reinforced aerogel layer beneath at least one felting needle and where at least one layer being a top layer that defines an exposed surface; and b) penetrating said laminate through said exposed surface with said at least one felting needle thereby transporting fibers within the laminate.

Another method comprises the steps of:

a) disposing a laminate comprising at least two layers of adjacent fiber reinforced aerogels beneath at least one felting needle and where at least one layer being a top layer that defines an exposed surface; and b) penetrating said laminate through said exposed surface with said at least one felting needle thereby transporting fibers within the laminate.

DESCRIPTION

Manipulation of aerogels, one of the best known insulators, can be very challenging given the fragility of this material form. The development of fiber-reinforced aerogels has yielded a more adaptable aerogel composite form with improved mechanical properties such as conformability and flexibility without any substantial loss of thermal insulation performance. However, few methodologies have yet been developed for securing or attaching these fiber reinforced forms. Moreover, securing mechanisms that do not involve an extrinsic component such as stitches, tags, rivets, adhesives, staples, tapes, and the like have remained virtually unexplored. Extrinsic components are undesirable considering that they can: add weight, fail under the adverse conditions (high thermal loads, cryogenic temperatures, etc.) and can increase production cost. For instance, most adhesives do not perform well and ultimately fail at cryogenic temperatures such as those encountered by insulation systems in liquid natural gas (LNG) pipelines. At high operating temperatures, many adhesives tend to burn off, plastic tags can melt and stitchings may fail. Such tendencies are likely to be experienced by aerogel based fireproofing systems, or other high temperature applications such as the hot sections of aircraft engines and solid rocket motors.

To date, typical mechanical tacking methods for fiber reinforced aerogels require the introduction of an extrinsic component, such as a metal rivet or a fiber stitch. As is the case with chemical systems, the introduction of a foreign material to the insulation system is likely to limit the acceptable operating conditions of the system. In the case of a weight sensitive product, such as insulation or fireproofing systems for marine or space vehicles, the weight pick-up gained by adding metal rivets or tags is undesirable. For this and various other reasons it is clear that a need for securing methods which do not utilize extrinsic components still persists for fiber-reinforced aerogels.

Embodiments of the present invention describe methods for securing fiber-reinforced-aerogels and products derived therefrom. In particular, current embodiments exploit the benefits of needle-punching technology for manipulating fiber reinforced aerogels. For instance a plurality of layers comprising aerogels reinforced with a batting or felt can be tacked together using the needle punching process. Also, acrogel blankets along with other fibrous layers can be secured accordingly. This system minimizes added weight, eliminates need for fallible external components and without compromising thermal insulating performance.

One aspect of the present invention involves methods for securing fiber-reinforced aerogels to: fiber-containing materials, fiber-reinforced aerogels, or both. This can be accomplished by via "needle-punching" technique; also sometimes known as "needling." Another aspect relates to laminates or multiple layered structures comprising at least one layer of fiber-reinforced aerogel secured to a fiber-containing material, a fiber-reinforced aerogel or both. "Fiber-containing material" as used herein denotes any material with fibers conducive to needle-punching. In other words fibers in the fiber-containing material can intermix, interpenetrate, intertwined, interlaced, interwoven or entangle with fibers of another material as a result of needle-punching. When the word "interlaced" is used, it is meant to encompass one or more or all of the preceding verbs to illustrate how fibers are in the embodiments of the invention. Fiber-containing materials may be exemplified by, but not limited to fibrous structures, fiber-reinforced foam composites or fiber-reinforced polymeric composites. Fibrous structures are further exemplified by, but not limited to: felts, battings, lofty battings, mats, woven fabrics, non-woven fabrics or combinations thereof. Suitable fiber compositions include essentially all natural and synthetic fibers which may be based on organic, inorganic or both compounds. Examples of natural fibers include, but are not limited to: wool, cotton, silk, linen, hemp, ramie, and jute. Examples of synthetic fibers include, but are not limited to: acetate, acrylic, latex, nylon, polyester, rayon, spandex.

Other fibers may be based on fiberglass, quartz, polyethylene, polypropylene, polybenzimidazole (PBI), polyphenylenebenzo-bisoxasole (PBO), polyetheretherketone (PEEK), polyarylate, polyacrylates, polytetrafluoroethylene (PTFE), poly-metaphenylene diamide, poly-paraphenylene terephthalamide, ultra high molecular weight polyethylene (UHMWPE), novoloid resins, polyacryolintrile (PAN), polyacrylonitrile-carbon and carbon fibers.

Needle-punching is a known technique for attaching or orienting non-woven fiber-containing materials into stable, usable forms. Needle-punched non-wovens are prepared via mechanical orientation and interlocking of fibers such as those in a spun bonded or carded web form. For instance, effective mechanical interlocking between layers is achieved via a plurality of barbed felting needles passing into and out of the fiber mass (at varying locations) where the barbs on the needles carry fibers from one ply through to another. The displaced fibers generated by the needling process are often referred to as "Z-fibers" since they are generally perpendicular to the plane of the fibrous layer. Examples of needle-punched final products are: tennis court surfaces, space shuttle tiles, boat hull composites, automotive carpeting, automotive insulation, filtration media, geo textiles, vinyl substrates, primary carpet backing, secondary carpet backing, fiberglass matting, ballistic felts, tennis ball felts, aerospace brake pads, oil absorbents, and many others.

FIG. 1 is an exemplary needle-punching process. Here, the laminate 4 (containing fiber reinforced aerogel+fiber containing material or two or more fiber reinforced aerogels) is fed into a needle-loom 6 via feed rolls 2. A bed of needles 12 secured to a beam board 8 is cyclically driven using a main drive 10 to penetrate the layers in consecutive sections resulting in the needle-punched products 14 which are subsequently wound using draw off rolls 16. In the context of certain embodiments of the present invention, said layers 4 comprise a layer of fiber-reinforced aerogel and: at least one layer of a fiber-containing material, at least one layer of another fiber reinforced aerogel, or both. Other forms of needle punching that are applicable to embodiments of the present invention involve needle punching via a structuring loom or random velour loom. Furthermore needle-punching can be carried out discontinuously for example where distinct sections are needle-punched in one shot. Various other modifications can be used for the needle punching process depending on the fabrication needs. For instance, a needle punching device enabling measurement of penetration depth is described in WO02070807A 1 hereby incorporated by reference. Hence it should be recognized that the needle-punching concept as a whole is embraced by the embodiments presented herein.

As noted earlier, aerogels describe material forms with typically excellent thermal insulation, among other properties. As used herein, "aerogel" and "aerogel materials" refer to gel containing air as a dispersion medium in a broad sense and gels dried via supercritical fluids in a narrow sense. The chemical composition of aerogels can be inorganic, organic (including polymers) or hybrid organic-inorganic. Inorganic aerogels may be based on Silica, Titania, Zirconia, Alumina, Hathia, Yttria, Ceria, Carbides and Nitrides. Organic aerogels can be based on compounds including but are not limited to:

urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiane, melamine-formaldehyde, phenol-furfural, a member of the polyether family of materials or combinations thereof. Examples of organic-inorganic hybrid aerogels include, but are not limited to: silica-PMMA, silica-chitosan, silica-polyether or possibly a combination of the aforementioned organic and inorganic compounds. Published US patent applications 2005/0192367 and 2005/0192366 teach extensively of such hybrid organic-inorganic materials and are hereby incorporated by reference in their entirety. In the preferred embodiments of the present invention, silica aerogels are discussed whereas the invention as a whole may be practiced with other aerogel compositions as well. The preferred method of preparing aerogels in the current embodiments is via drying of gels derived the sol-gel process. Said process is described in great detail in Brinker C. J., and Scherer G. W., Sol-Gel Science; New York: Academic Press, 1990 which is hereby incorporated by reference.

Gels may be additionally aged prior to drying to further strengthen the network structure thereof by increasing the number of cross-linkages. This procedure is potentially useful for preventing potential volume loss during drying. Aging can involve: maintaining the gel (prior to drying) at a quiescent state for an extended period, maintaining the gel at elevated temperatures, addition of cross-linkage promoting compounds or any combination thereof. Aging time period typically requires between about 1 hr and several days. The preferred temperatures are usually between about 10.degree. C. and about 100.degree. C.

For optimal thermal insulation, aerogels can be opacified to reduce the radiative component of heat transfer. At any point prior to gel formation, opacifying compounds, radiation absorbing compounds, radiation reflecting compounds, thermally conductive components, electrically conductive components, radar blocking components may be dispersed into the mixture comprising gel precursors. Examples of opacifying compounds include and are not limited to: $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

Aerogels may be surface treated to impart or improve hydrophobicity. The hydrophobic treatment is carried out by reacting a hydroxy moiety of a silanol group present on a surface of the wet-gel compound (silica gel) with a functional group of a hydrophobing agent thereby converting the silanol group into a hydrophobic group of the hydrophobicity-imparting agent. For example, the hydrophobing treatment can be carried out by immersing a gel in a hydrophobicity-imparting solution of a hydrophobing agent in a solvent, and mixing the gel and the solution to allow the hydrophobicity-imparting agent to permeate the gel, while if necessary, heating such a gel mixture so that a hydrophobicity-imparting reaction occurs. Examples of the solvent for use in the hydrophobing treatment include methanol, ethanol, isopropanol, xylene, toluene, benzene, N,N-dimethylformamide, hexamethyldisiloxane and the like. There is no particular limit in selection of the solvent, in so far as the solvent can easily dissolve the hydrophobing agent and can replace the solvent contained in the gel before the hydrophobing treatment. Where the supercritical drying is carried out after the hydrophobing treatment, the solvent to be used in the hydrophobing treatment is preferably a medium that facilitates the supercritical drying (e.g., methanol, ethanol, isopropanol, liquefied carbon dioxide or the like), or a medium which can be replaced with the former medium. Examples of the hydrophobing agent include hexamethyldisilazane, hexamethyldisiloxane, trimethylmethoxysilane, dimethyldimethoxysilane, methyltrimethoxysilane, ethyltrimethoxysilane, trimethylethoxysilane, dimethyldiethoxysilane, methyltriethoxysilane and the like. Hydrophobing treatments are further described in U.S. Pat. No. 5,565,142 hereby incorporated by reference.

Drying plays an important role in engineering the properties of aerogels, such as porosity and density which influence the material thermal conductivity. To date, numerous drying methods have been explored. U.S. Pat. No. 6,670,402 teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 describes a process whereby Resorcinol/Formaldehyde aerogels can be manufactured using a simple air drying procedure. Finally, U.S. Pat. No. 5,565,142 herein incorporated by reference describes sub-critical drying techniques. The embodiments of the present invention can be practiced with drying using any of the above techniques. In some embodiments, it is preferred that the drying is performed at vacuum to below super-critical pressures (pressures below the critical pressure of the fluid present in the gel at some point) and optionally using surface modifying agents.

Aerogels may be fiber-reinforced with various fibrous structures to achieve a more conformable composite product. Suitable fibrous structures include, but are not limited to wovens, non-wovens, mats, felts, battings, lofty battings and combinations thereof. Aerogel composites reinforced with a fibrous batting, herein referred to as "blankets", are particularly useful for applications requiring flexibility since they are highly conformable and are excellent thermal insulators. Aerogel blankets and similar fiber-reinforced aerogel composites are described in published US patent application 2002/0094426A1 and U.S. Pat. Nos. 6,068,882; 5,789,075; 5,306,555; 6,887,563 and 6,080,475 all hereby incorporated by reference, in their entirety. Fiber reinforced aerogels of 2002/0094426 are particularly useful in the embodiments herein where a continuous aerogel matrix or a "monolithic" aerogel matrix is reinforced by a fiber component like a fibrous batting. It is noted here that an aerogel blanket is a flexible aerogel composite that can be used like a blanket to cover surfaces of simple or complex geometry.

Applications involving aerogel blankets can benefit tremendously from the needle punching technique. This novel method for manipulating aerogel blankets can be used in a variety of applications involving attachment of the blankets to any other fibrous materials and/or creating a coherent lay up of insulating plies. Although the aerogel matrix might be locally disrupted upon needle penetration, the integrity of the needled end-product is usually not compromised. In order to optimize needle punching of fiber-reinforced aerogel composites the following factors are worth considering: needle puncture density, needle penetration depth, needle characteristics (crank, shank, blade, barb, point, etc.), aerogel density, aerogel material (Organic, inorganic, hybrid organic-inorganic), fiber/aerogel volume ratio, fiber forms (batting, felt, mat, chopped fibers) and fiber compositions (polyester, carbon, silica, etc.) Needles with the desired attributes such as crank, shank, blade, barb, point properties, aspect ratio or modulus can be obtained from a variety of vendors such as Foster Needle inc. Examples of companies that currently engage in manufacture of needle-punched products include Shoo Shyng Machinery co., Ltd. and American Felt and Filter Company (AFFCO.) Insulation systems often require several inches in thickness in order to achieve the overall required R-value (R=resistance to heat flow.) Larger overall R values are achieved by stacking multiple plies of an insulating material, since R values of individual plies simply add up. Though not wishing to be bound by theory, temporal considerations related to the kinetics of sol-gel chemistry of gel preparation (and subsequent drying), suggests that an upper limit on fiber-reinforced aerogel thickness often exists (for example ½") when manufactured in a cost-effective manner. As such, requirements for certain insulation applications involving fiber-reinforced aerogels must be met by constructing a laminate (i.e. multiple ply) comprising secured insulation layers.

In one embodiment a laminate comprises at least one fiber-reinforced aerogel layer adjacent to at least one layer of fiber-containing material wherein fibers from said at least one fiber-reinforced aerogel layer are interlaced with fibers of said at least one fiber-containing material. The layer(s) of fiber-containing material can comprise a felt, batting, lofty batting, mat, woven fabric, non-woven fabric or combinations thereof. Alternatively or in addition to, the layer(s) of fiber-containing material can comprise a fiber-reinforced foam composite or fiber-reinforced polymeric composite. The layers can be needle-punched once to form the final laminate. Alternatively, successive layers can be individually needle punched each time to add to the stack. Potential applications include instances where an aerogel blanket can be needled to a carpet as a backing, to an apparel article as lining, or to a fibrous surface as a thermal shield.

In another embodiment a laminate comprises at least two adjacent fiber-reinforced aerogel layers wherein fibers from at least one fiber-reinforced aerogel layer are interlaced with fibers of an adjacent fiber-reinforced aerogel layer. The layers can be needle-punched once to form the final laminate. Alternatively, successive layers can be individually needle punched each time to add to the stack.

In yet another embodiment, a laminate comprises at least two layers of fiber-reinforced aerogels and a fiber-containing material there between. Preferably the fiber containing material is selected from felt, batting, lofty batting, mat, woven fabric, non-woven fabric or combinations thereof. This arrangement may be particularly useful for instances where fiber-reinforced aerogels do not secure well to one another after needling wherein the in between layer serves to better secure the layers to one another.

In a special embodiment, at least one functional layer is incorporated into the laminate structure comprising fiber-reinforced aerogels via needle punching. The functional layer may be radiation absorbing, radiation reflecting, thermally conductive or electrically conductive. Metallic sheets, metallized polymeric sheets and the like are few non limiting examples. Of course it is desirable that the functional layer be compliant with needle punching such that this process is not hindered.

In yet another embodiment, the thermal conductivity of the fiber interlaced laminate is substantially same as that of the fiber reinforced aerogel component. In other words, any mechanical damage caused by needling process was surprisingly negligible and hence interlacing using different embodiments of the present invention prove to be very useful for securing fiber reinforced aerogel to a fiber containing material or for securing more than one layers of fiber reinforced aerogel layers.

In another special embodiment, a laminate is formed from angular needling of the layers. In other words, at least one layer of fiber reinforced aerogel is needled at an angle non-perpendicular to the plane of said layer. More specifically, the laminate is needled at least twice at different angles preferably creating cross-entanglement of the drawn fibers.

In another embodiment, a blanket is needled to a fibrous structure wherein said fibrous structure is subsequently permeated with a polymeric material and which is cured therein. The result is a polymeric coating on a fiber reinforced aerogel. Said coating can be highly useful for instance, as an abrasion or chemical resistant layer for the aerogel. Additionally, the fiber reinforced aerogel can be molded to a shape and held in place with a hard coating. The following is one exemplary mode:
a) Fiber reinforced aerogel needled to a fibrous structure such as felt, batting, lofty batting, mat, woven fabric, non-woven fabric or combinations thereof, thereby forming a laminate structure;
b) The laminate structure is bent or otherwise manipulated to a desired shape, and held in place;
and c) A polymeric material is transferred into the fibrous structure and cured therein.

Various shapes might be achievable with this structure Such as half-pipes, hemispheres, and various others. Thus preformed shaped aerogel insulations are made possible via this method.

In another special embodiment, fiber reinforced wet gels are needled prior to drying to form a laminate structure. A "wet gel" may be understood as the un-dried gel comprising solvent and/or diluent filled pores. The laminates prepared accordingly are subsequently dried via techniques previously discussed. Methods for producing such gel sheets is described in published US patent application 2005/0167891A1 which is incorporated by reference in its entirety. An advantage in needling wet gels is that less damage to the overall aerogel matrix is sustained relative to needling after the aerogel is dried. Furthermore, needling the fiber-reinforced wet-gel to of fibrous layer, for instance a low density lofty batting, can serve as a spacing layer, for enhancing flow of the drying medium (e.g. supercritical fluid) once a wet aerogel blanket is rolled and transferred to the drying, preferably in a supercritical fluid drying.

The individual layers of the laminate can be of any thickness but in a preferred embodiment, it is between about 1/16 in and about 1/2 in. The final product will have an R value that is the sum or better than the sum of each individual aerogel blanket R value thereby providing similar or improved thermal performance relative to a single blanket layer of the same thickness. This procedure can be repeated to add layers to an already needle punched stack.

In yet another embodiment, external fibers or yarns are introduced using needles through the layers of the laminate such that the layers of the aerogel laminate are quilted together.

There are various art recognized quilting techniques that can be used. The variables such as quilting patterns, needle size (length and thickness), external (external to the layers of the laminate) fiber type and thickness and frequency and movement of the laminates through the quilting machine may be adjusted to provide the end result such that the aerogel thermal performance is not substantially changed from unquilted laminates of similar thickness and type. Several types of yarns may be used for quilting or stitch bonding as described below including polyester, carbon, polyacrylonitrile, silica, glass, cotton, rayon, acrylics, Kevlar type material, and Nomex type material.

In yet another embodiment, techniques such as stitch bonding can also be used to accomplish the same purpose of joining more than one layer in the laminate. Standard lock and chain stitches may be used or modified lock stitch in which knots linking needle and bobbin threads are formed at one surface of the laminate to minimize in plane fiber distortion. Further information on Stitch bonding is described in Potluri, P. et al., Composite Structures, 59, 251-259 (2003) which is incorporated in its entirety here. It is important to point out that though aerogel type materials are fragile, it was surprisingly found that quilting or stitch bonding does not damage the aerogel composite material enough to have a substantial impact on the thermal performance of the quilted or stitch bonded laminates. This surprising result leads to very simple way of attaching layers of aerogel composites or fiber reinforced aerogel composites without any complex steps.

The needle punching art as a whole is integral to embodiments of the present invention whereby needled products comprising fiber-reinforced aerogels are prepared. The following includes a few non-limiting modes for practicing certain specific embodiments of the present invention, where one comprises the steps of:
a) disposing a laminate comprising at least one layer of a fiber-containing material adjacent to at least one fiber-reinforced aerogel layer beneath at least one felting needle and where at least one layer being a top layer that defines an exposed surface; and
b) penetrating said laminate through said exposed surface with said at least one felting needle thereby transporting fibers within the laminate.

Another method comprises the steps of:
a) disposing a laminate comprising at least two layers of adjacent fiber reinforced aerogels beneath at least one felting needle and where at least one layer being a top layer that defines an exposed surface; and
b) penetrating said laminate through said exposed surface with said at least one felting needle thereby transporting fibers within the laminate.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims that follow. The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

The invention claimed is:
1. A composite comprising at least one first fiber-reinforced aerogel layer component adjacent to at least one second fiber-reinforced aerogel layer component, wherein the first fiber-reinforced aerogel layer component and the second fiber-reinforced aerogel layer component comprise a felt, batting, lofty batting, mat, nonwoven fabric or a combination thereof, wherein said first fiber-reinforced aerogel layer component comprises a first preformed monolithic aerogel matrix and said second fiber-reinforced aerogel layer component comprises a second preformed monolithic aerogel matrix, wherein said first preformed monolithic aerogel matrix is distinct from and substantially not connected with said second preformed monolithic aerogel matrix, wherein first fibers of said first fiber-reinforced aerogel layer component are interlaced with second fibers of said second fiber-reinforced aerogel layer component, wherein the first preformed monolithic aerogel matrix and the second preformed monolithic aerogel matrix are locally disrupted, and wherein the integrity of the composite is not substantially compromised.

2. The composite of claim 1 further comprising a functional layer that is radiation absorbing, radiation reflecting, radar blocking, thermally conductive or electrically conductive materials.

3. The composite of claim 1 wherein at least one of the first preformed aerogel matrix and the second preformed aerogel matrix comprises inorganic materials chosen from Silica, Titania, Zirconia, Alumina, Hafnia, Yttria, Ceria, Carbides, Nitrides or combinations thereof.

4. The composite of claim 1 wherein at least one of the first preformed aerogel matrix and the second preformed aerogel matrix comprises organic materials chosen from urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiane, melamine-formaldehyde, phenol-furfural, a member of the polyether family of materials or combinations thereof.

5. The composite of claim 1 wherein at least one of the first preformed aerogel matrix and the second preformed aerogel matrix comprises an organic material and an inorganic material.

6. The composite of claim 1 wherein the first fiber in the first fiber-reinforced aerogel layer component or the second fiber in the second fiber-reinforced aerogel layer component is chosen from wool, cotton, silk, linen, hemp, ramie, and jute, acetate, acrylic, latex, nylon, polyester, rayon, spandex, fiberglass, quartz, polyethylene, polypropylene, polybenzimidazole (PBI), polyphenylenebenzo-bisoxasole (PBO), polyetheretherketone (PEEK), polyarylate, polyacrylates, polytetrafluoroethylene (PTFE), poly-metaphenylene diamide, poly-paraphenylene terephthalamide, ultra high molecular weight polyethylene (UHMWPE), novoloid resins, polyacryolintrile(PAN), polyacrylonitrile-carbon, carbon fibers or combinations thereof.

7. The composite of claim 1, wherein the first fibers from said at least one first fiber-reinforced aerogel layer component are interlaced with the second fibers of said at least one second fiber-reinforced aerogel layer component using needles.

8. The composite of claim 1, further comprising a polymeric coating on at least one of said first fiber-reinforced aerogel layer component or said second fiber-reinforced aerogel layer component.

9. The composite of claim 1, wherein said composite has a thermal conductivity that is substantially the same as a non-interlaced combination of said at least one first fiber-reinforced aerogel layer component and said at least one second fiber-reinforced aerogel layer component.

10. The composite of claim 1, wherein said composite is substantially free of adhesives between said at least one fiber-reinforced aerogel layer and said at least one layer of fiber-containing material.

11. A composite comprising at least one first fiber-reinforced aerogel layer component adjacent to at least one second fiber-reinforced aerogel layer component, wherein the first fiber-reinforced aerogel layer component and the second fiber-reinforced aerogel layer component comprise a felt, batting, lofty batting, mat, nonwoven fabric or a combination thereof, wherein said first fiber-reinforced aerogel layer component comprises a first preformed monolithic aerogel matrix and said second fiber-reinforced aerogel layer component comprises a second preformed monolithic aerogel matrix, wherein said first preformed monolithic aerogel matrix is distinct from and substantially not connected with said second preformed monolithic aerogel matrix, wherein first fibers of said first fiber-reinforced aerogel layer component are interlaced with second fibers of said second fiber-reinforced aerogel layer component, wherein the first preformed monolithic aerogel matrix and the second preformed monolithic aerogel matrix are locally disrupted, and wherein the composite has an R value that is at least the sum of each fiber-reinforced aerogel layer component R value.

12. The composite of claim 11 further comprising a functional layer that is radiation absorbing, radiation reflecting, radar blocking, thermally conductive or electrically conductive materials.

13. The composite of claim 11 wherein at least one of the first preformed aerogel matrix and the second preformed aerogel matrix comprises inorganic materials chosen from Silica, Titania, Zirconia, Alumina, Hafnia, Yttria, Ceria, Carbides, Nitrides or combinations thereof.

14. The composite of claim 11 wherein at least one of the first preformed aerogel matrix and the second preformed aerogel matrix comprises organic materials chosen from urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiane, melamine-formaldehyde, phenol-furfural, a member of the polyether family of materials or combinations thereof.

15. The composite of claim 11 wherein at least one of the first preformed aerogel matrix and the second preformed aerogel matrix comprises an organic material and an inorganic material.

16. The composite of claim 11 wherein the first fiber in the first fiber-reinforced aerogel layer component or the second fiber in the second fiber-reinforced aerogel layer component is chosen from wool, cotton, silk, linen, hemp, ramie, and jute, acetate, acrylic, latex, nylon, polyester, rayon, spandex, fiberglass, quartz, polyethylene, polypropylene, polybenzimidazole (PBI), polyphenylenebenzo-bisoxasole (PBO), polyetheretherketone (PEEK), polyarylate, polyacrylates, polytetrafluoroethylene (PTFE), poly-metaphenylene diamide, poly-paraphenylene terephthalamide, ultra high molecular weight polyethylene (UHMWPE), novoloid resins, polyacryolintrile(PAN), polyacrylonitrile-carbon, carbon fibers or combinations thereof.

17. The composite of claim 11, wherein the first fibers from said at least one first fiber-reinforced aerogel layer component are interlaced with the second fibers of said at least one second fiber-reinforced aerogel layer component using needles.

18. The composite of claim 11, further comprising a polymeric coating on at least one of said first fiber-reinforced aerogel layer component or said second fiber-reinforced aerogel layer component.

19. The composite of claim 11, wherein said composite is substantially free of adhesives between said at least one fiber-reinforced aerogel layer and said at least one layer of fiber-containing material.

* * * * *